United States Patent [19]

Tsubouchi

[11] Patent Number: 4,491,056
[45] Date of Patent: Jan. 1, 1985

[54] SUCTION PRESSURE OPERATED BOOSTER FOR AUTOMOBILE BRAKE SYSTEMS

[75] Inventor: Kaoru Tsubouchi, Toyota, Japan

[73] Assignee: Aisin Seiki Kabushiki Kaisha, Kariya, Japan

[21] Appl. No.: 486,547

[22] Filed: Apr. 19, 1983

[30] Foreign Application Priority Data

Apr. 20, 1982 [JP] Japan .................. 57-66493
Apr. 20, 1982 [JP] Japan ............. 57-57922[U]
Apr. 20, 1982 [JP] Japan ............. 57-57923[U]
Apr. 20, 1982 [JP] Japan ............. 57-57924[U]

[51] Int. Cl.³ .................. F15B 9/10; B60T 13/20
[52] U.S. Cl. .................. 91/369 A; 92/98 D; 60/554
[58] Field of Search ............ 91/369 R, 369 A, 369 B, 91/376 R; 92/98 D, 99, 101, 128, 167; 60/554

[56] References Cited

U.S. PATENT DOCUMENTS

| | | | |
|---|---|---|---|
| 3,110,031 | 11/1963 | Price ..................... | 60/54.5 |
| 3,502,003 | 3/1970 | Dobrikin et al. ............ | 92/101 |
| 4,069,747 | 1/1978 | Forry et al. ............... | 92/167 |
| 4,271,670 | 6/1981 | Ohmi ...................... | 60/554 X |
| 4,282,799 | 8/1981 | Takeuchi ................... | 91/369 |
| 4,450,688 | 5/1984 | Boehm ...................... | 92/98 D |

FOREIGN PATENT DOCUMENTS

| | | | |
|---|---|---|---|
| 35370 | 9/1981 | European Pat. Off. ........ | 91/369 A |
| 75253 | 6/1981 | Japan ..................... | 91/369 A |
| 2044376 | 10/1980 | United Kingdom ........... | 91/369 A |
| 2082276 | 3/1982 | United Kingdom ........... | 91/369 R |

Primary Examiner—Irwin C. Cohen
Assistant Examiner—John M. Husar
Attorney, Agent, or Firm—Finnegan, Henderson, Farabow, Garrett & Dunner

[57] ABSTRACT

A negative pressure booster for an automobile brake system includes a housing having an inside cavity, a power piston being provided in the housing for dividing the inside cavity of the housing into a suction pressure chamber and an atmospheric pressure chamber. An output rod is associated with the power piston and extends outwardly through the housing. A manually actuated control valve is carried by the power piston for controlling the communication between the suction pressure and atmospheric pressure chambers and the communication between the atmospheric pressure chamber and atmosphere. A pipe is provided for connecting the suction pressure chamber with a source of negative pressure. The power piston includes a hub made of a plastic material formed with a stepped axial hole having a large diameter hole section and a small diameter hole section which are connected together through a stepped shoulder portion, the output rod having a head axially slidably received in the large diameter portion and a radially extending annular flange adapted for abutting engagement with an end surface of the hub.

6 Claims, 2 Drawing Figures

SUCTION PRESSURE OPERATED BOOSTER FOR AUTOMOBILE BRAKE SYSTEMS

BACKGROUND OF THE INVENTION

The present invention relates to a negative pressure booster for use with a brake master cylinder of an automobile.

Conventionally, negative pressure boosters of this type include a housing and a power piston which divides the interior of the housing into a suction pressure chamber and an atmospheric pressure chamber. The suction pressure chamber is connected with the engine intake passage so that the suction pressure produced in the engine intake passage is introduced into the suction pressure chamber. The power piston has a communication passage which connects the suction pressure chamber with the atmospheric pressure chamber through valve means. The atmospheric pressure chamber is also provided with second valve means which is normally closed but functions to selectively open the atmospheric pressure chamber to the atmosphere. When the brake is released, the first valve means is opened to connect the two chambers with each other and the second valve means closed to disconnect the atmospheric pressure chamber from the atmosphere, so that the pressures in the two chambers are balanced and the power piston is maintained in the retracted position. When the brake pedal is depressed, however, the first valve means is closed and the second valve means is opened so that the atmospheric pressure is introduced into the atmospheric pressure chamber. Thus the power piston is forced under the pressure difference between the two chambers to move the output rod connected therewith.

As disclosed in the U.S. Pat. No. 4,282,799 issued on Aug. 11, 1981 to H. Takeuchi, the power piston in the conventional negative pressure booster comprises a diaphragm having a periphery secured to the housing and a central hub to which the output rod is connected. The central hub is made of a plastic material and formed with a central hole of a stepped configuration. The central hole includes a large diameter hole section facing the suction pressure chamber and a small diameter hole section connected to the large diameter section through a stepped shoulder portion. The output rod has an output piston which is formed at one end thereof and axially slidably received in the large diameter hole section in the central hub. In the bottom portion of the large diameter hole section, there is a resilient piston which is usually made of a rubber and a reaction piston is disposed in the small diameter hole section for the purpose as described in the aforementioned U.S. patent.

In this type of booster, the central hub is associated with the brake actuating push rod through a ball joint so that the central hub can incline with respect to the axis of the push rod. However, since the central hub is connected with the output rod through the slidable engagement between the output piston on the output rod and the hole in the central hub, the output rod is always maintained in the axially aligned position with respect to the central hub of the power piston. Thus, any tendency of inclining the power piston is resisted by the output piston which applies a radial reaction force to the wall of the large diameter hole section. Further, any axial pressure which may be applied to the resilient piston in brake operation tends to make it radially expand so that the wall of the large diameter hole section is additionally applied with a radially directed pressure.

Due to these radially directed forces, the conventional structures have problems in that the central hub may become cracked particularly at the corner of the stepped shoulder portion.

A further problem encountered in the conventional negative pressure booster is that it is bulky as compared with other automobile components. In order to provide a required amount of output, the booster must necessarily have a certain amount of pressure acting area as well as sufficient operating stroke movement of the power piston. It should however be noted that in the conventional structures there is provided an unnecessary clearance between the power piston and the housing in the extended position. Further, the central hub of the power piston must have a sufficient axial length so that the parts of the valve mechanism are housed therein and due to the axial length of the central hub it has been difficult to make the booster compact.

SUMMARY OF THE INVENTION

It is therefore an object of the present invention to provide a negative pressure booster in which the axial alignment between the power piston and the output rod can be maintained without producing dangerous radial pressure between the output rod and the wall of the center hole in the power piston.

Another object of the present invention is to provide a negative pressure booster which is small in capacity as compared with conventional boosters.

A further object of the present invention is to provide a booster which is more durable than conventional boosters and has decreased risk of being broken in operation.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

According to the present invention, the above and other objects can be accomplished by a negative pressure booster for an automobile brake system comprising housing means having an inside cavity, power piston means provided in said housing means for dividing the inside cavity of the housing means into a first chamber and a second chamber, an output rod associated with said power piston means and extending outwardly through said housing means, manually actuated control valve means carried by said power piston means for controlling communication between the first and second chambers and communication between one of the chambers and atmosphere, means for connecting the other chambers with a source of negative pressure, said power piston means including hub means made of a plastic material formed with a stepped axial hole having a large diameter hole section and a small diameter hole section which are connected together through a stepped shoulder portion, said output rod having a head axially slidably received in the large diameter portion and a radially extending annular flange adapted for abutting engagement with an end surface of the hub means, said flange being spaced from said hub end surface by a gap ($\delta$) which gap decreases and is eliminated during operation of the booster as said flange moves into such abutting engagement. In the above arrangement, the output rod is maintained in an axially aligned position with respect to the hub means through the abutting engagement of the annular flange with the end surface of the hub means so that substantial radial pressure will not be produced between the head and the wall of the hole formed in the hub means. Therefore, it is possible to avoid the possibility of the hub means being cracked under the force inclining the hub means.

According to another aspect of the present invention, the power piston means includes a diaphragm having a peripheral portion secured to the housing means and carrying said hub means, said power piston means being movable between a retracted position in which the diaphragm is folded and an extended position in which the diaphragm is stretched, said housing means having a wall located close to the diaphragm in the extended position with minimum clearance. This arrangement is effective to reduce the axial dimension of the booster.

The accompanying drawings, which are incorporated in and constitute a part of this specification, illustrate an embodiment of the invention and, together with the description, serves to explain the principles of the invention.

DESCRIPTION OF THE PREFERRED EMBODIMENT

Figures 1, 2:
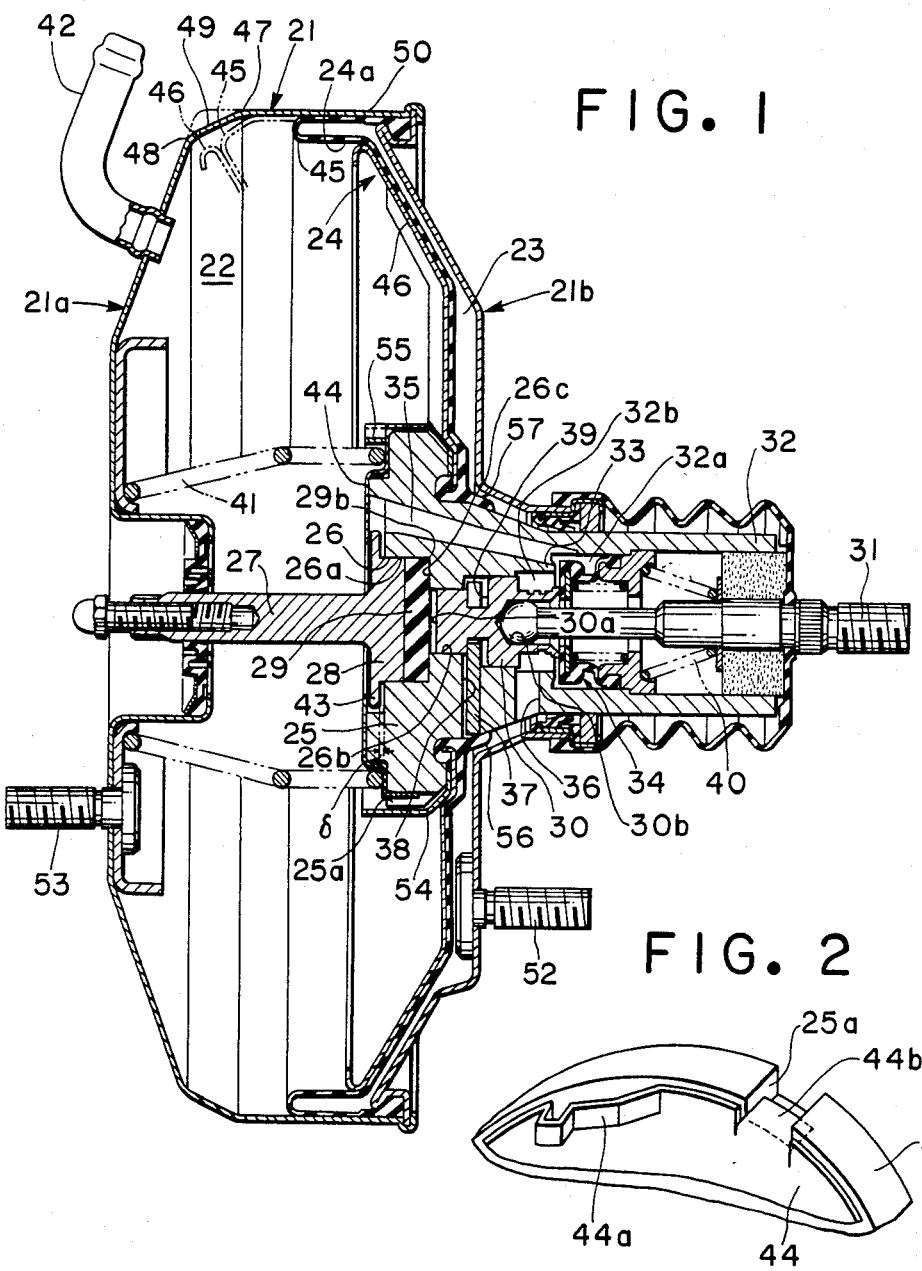
FIG. 1 is an axial sectional view of a negative pressure booster constructed in accordance with one embodiment of the present invention; and, FIG. 2 is a fragmentary perspective view showing details of the central hub used in the embodiment of FIG. 1.

Referring to the drawings, particularly to FIG. 1, there is shown a negative pressure booster comprised of a housing 21 which is constituted by a housing front half 21a and a housing rear half 21b which are connected together at their peripheries. In the housing 21, there is disposed a power piston 24 including a diaphragm 24a and a central hub 25. The diaphragm 24a has an outer peripheral portion formed with an annular bead which is air-tightly held between the housing halves 21a and 21b. The diaphragm 24a further has an inner periphery formed with an annular bead which is fitted to an annular groove in the central hub 25. The central hub 25 is made of a plastic material such as a phenol resin and formed at the center thereof with an axial hole 26 for receiving an output rod 27.

The power piston 24 divides the interior cavity of the housing 21 into a suction or negative pressure chamber 22 and an atmospheric pressure chamber 23. The hole 26 formed in the central hub 25 is of a stepped configuration having a large diameter hole section 26a facing the suction pressure chamber 22, and a small diameter hole section 26b which are connected together through a stepped shoulder 26c. The output rod 27 has a cylindrical head 28 which is axially slidably received by the large diameter hole section 26a. At the junction between the output rod 27 and the head 28, there is formed a radially extending flange 43 which is adapted to be brought into abutting engagement with the front surface of the central hub 25.

A retaining plate 44 is attached to the front surface of the central hub 25 so as to prevent the head 28 of the output rod from being removed from the hub 25. A power plate 46 is attached to the diaphragm 24a at a side facing to the suction pressure chamber 22 and has an inner peripheral portion secured to the central hub 25 together with the inner peripheral portion of the diaphragm 24a. A compression spring 41 is provided in the suction pressure chamber 22 to act between the housing front half 21a and the central hub 25 to thereby force the power piston 24 toward right in FIG. 1. The chamber 22 is connected with a suction pressure pipe 42 which leads to a suitable suction pressure source such as an engine intake passage. Thus, when the chamber 23 is supplied with a suction pressure so that the pressures in the two chambers 22 and 23 are balanced with each other, the power piston 24 is forced under the influence of the compression spring 41 to the retracted position as shown by full lines in FIG. 1.

It will be noted in FIG. 1 that in the retracted position the diaphragm 24a is folded back at the radially outer portion to form a rolling section 45 which is gradually moved as the power piston 25 is axially displaced. When the atmospheric pressure is introduced into the chamber 23, the power piston 24 is forced toward left to the extended position as shown by phantom lines in FIG. 1 so that the output rod 27 is projected from the housing 21. In the extended position, the diaphragm 24a is substantially fully stretched. As shown in FIG. 1, the housing front half 21a is formed at the front corner portion with a tapered configuration 49 which extends between bent corner portions 47 and 48 substantially along the front outer periphery of the power piston 24 in the extended position. This arrangement is effective to substantially decrease the dead space between the housing front half 21a and the power piston 24 so that the booster can be made more compact than a conventional design in which the front corner portion of the housing front half 21a is shaped as shown by phantom lines in FIG. 1.

In the large diameter hole section 26a, there is a circular resilient piston or reaction member 29 which is disposed between the shoulder 26c and the head 28 of the output rod 27. In the small diameter hole section 26b, there is slidably received an air valve seat 30 having a pressure surface 30a facing the reaction member 29. The air valve seat 30 has an axial bore 30b extending from the end opposite to the pressure surface 30a and receives one end of a push rod 31 which is connected with a brake pedal (not shown). The push rod 31 has a spherical portion at the aforementioned one end so that the air valve seat 30 is connected with the push rod 31 through a spherical connection.

The central hub 25 is formed with a cylindrical boss 32 which extends axially toward the direction opposite to the output rod 27 beyond the housing rear half 21b through an air-tight seal. In the cylindrical boss 32, there is formed an annular suction pressure blocking valve seat 33 which cooperates with a control valve 34. The central hub 25 has a communicating passage 35 which has one end opening to the suction pressure chamber 22 at the front surface of the central hub 25 and the other end opening to a space 32a formed in the boss 32 radially outwardly of the valve seat 33. In the boss 32, there is also formed a second space 32b radially inwardly of the valve seat 33, and the central hub 25 is formed with a radial passage 36 connecting the atmospheric pressure chamber 23 with the second space 32b. The control valve 34 functions to control the communication between the suction pressure chamber 22 and the atmospheric pressure chamber 23 by controlling the communication between the spaces 32a and 32b.

The air valve seat 30 also cooperates with the control valve 34 to disconnect the space 32b and therefore the chamber 23 from the atmosphere when the valve 34 is moved apart from the valve seat 33 but to open the space 32b to atmosphere when it is displaced toward left and the valve 34 is seated on the valve seat 33. The air valve seat 30 has an annular groove 39 which is engaged with a key 37 inserted into a slit 38 formed in the central hub 25 so that the air valve seat 30 is retained in a limited axial movement range. The valve 34 is forced toward left by means of a spring 40.

The flange 43 on the output rod 27 is located with a gap δ in the retracted position of the power piston 24 and the head 28 is in contact with the reaction member 29. The gap δ is determined as small as possible provided that the transmission of axial movement is not disturbed among the output rod 27, the reaction member 29, the central hub 25 and the air valve seat 30. When the push rod 31 is actuated axially leftwards, the air valve seat 30 is also forced leftward so that the control valve 34 is allowed to seat on the suction pressure valve seat 33 to break the communication between the chambers 22 and 23. A further movement of the push rod 31 causes the air valve seat 30 to move apart from the valve 34 whereby the chamber 23 is opened to the atmosphere. Thus, the atmospheric pressure is introduced into the chamber 23 and the power piston 24 is displaced under the pressure difference between the chambers 22 and 23 toward left to give the output rod 27 a leftward movement. The movement of the output rod 27 is transmitted to the brake master cylinder (not shown) to produce a hydraulic brake pressure.

A reaction force is transmitted from the output rod 27 to the reaction member 29 and a substantial portion of such reaction force is transmitted to the stepped shoulder 26c of the central hub 25. The remainder of the reaction force is transmitted to the air valve seat 30 and then to the push rod 31. At this instance, the resilient reaction member 29 is axially compressed so that the gap δ between the flange 43 on the output rod 27 and the front surface of the central hub 25 is decreased and finally eliminated. Therefore, even if there is produced an unbalanced force which tends to make the power piston 24 incline, such force is resisted by the flange 43 on the output rod 27 which is in contact with the front surface of the central hub 25. It is therefore possible to avoid concentration of force at the bottom corner of the large diameter hole section 26a of the hole 26. Thus, the arrangement is effective to prevent the central hub 25 from being broken at the bottom corner of the large diameter hole section 26a under a force tending to incline the power piston 25.

As the power piston is displaced leftwards, the rolling portion 45 on the diaphragm 24a is also moved toward the left until it reaches the position close to the tapered portion 49 of the housing front half 21a where the rolling portion 49 is substantially unfolded as shown by the phantom lines in FIG. 1. Since the housing front half 21a is so shaped at the front peripheral corner that it extends substantially along the power piston 24 by providing the aforementioned tapered portion 49, the volume of the housing can be decreased. Moreover, the configuration of the housing front half 21a is effective to make the housing more rigid than a conventional configuration so that it becomes possible to manufacture the housing with a thinner sheet metal.

As shown in FIG. 1, the housing 21 is provided with suitable number of bolts 52 by which the booster is attached to an automobile body panel such as a dash panel (not shown). Further, the housing 21 is also provided with suitable number of bolts 53 for mounting the booster on the brake master cylinder (not shown). In the braking operation, the brake reaction force applied from the output rod 27 to the central hub 25 of the power piston 24 tends to separate the housing rear half 21b from the housing front half 21a and may cause deformation of the housing 21. The increased rigidity of the housing front half 21a can sufficiently withstand the aforementioned tendency, to deform the housing 21.

Referring to FIG. 1, it will further be noted that the power plate 46 has a shallow cylindrical holder 54 which is welded thereto. The holder 54 is disposed so as to encircle the outer periphery of the central hub 25 and has a plurality of claws 55 at the front end. The claws 55 are bent radially inwardly to engage the front surface of the retainer 44 to thereby prevent the central hub 25 from being removed from the holder 54. The retainer 44 has a central opening, of which diameter is smaller than the diameter of the flange 43 on the output rod 27 so that the retainer 44 functions to hold the head 28 of the output rod 27 in the hole 26. As shown in FIG. 2, the retainer 44 further has a suitable number of cam surfaces 44a with which the claws 55 on the holder 54 are engaged so that the holder 54 is tightly engaged with the cental hub 25. In FIG. 2, it will also be noted that the retainer 44 is secured to the central hub 25 by providing the outer periphery of the retainer 44 with a plurality of claws 44b which are engaged with grooves or recesses 25a formed in the outer periphery of the central hub 25.

Referring again to FIG. 1, when the engine is not in operation, the atmospheric pressure prevails in the engine intake passage so that the suction pressure chamber 22 is under the atmospheric pressure. Since the atmospheric pressure chamber 23 is in communication with the chamber 22, the chamber 23 is also under the atmospheric pressure. If the brake actuating push rod 31 is moved toward left in this state, the movement is transmitted through the air valve seat 30 and the key 37 to the central hub 25. However, a rapid leftward movement of the power piston 24 is resisted since the pressure in the suction pressure chamber 22 cannot be exhausted rapidly through the suction pressure pipe 42. Thus, the claws 55 are fully subjected to the load applied to the central hub 25 by the push rod 31 through the air valve seat 30 and the key 37. In the illustrated arrangement, however, the claws 55 on the holder 54 are engaged with the sheet metal retainer 44 so that there will be no risk that the plastic central hub 25 be damaged by the claws 55 under such load.

Under a power assisted operation, the control valve 34 must be seated on the suction pressure valve seat 33 and moved apart from the air valve seat 30 as soon as the front surface 30a comes into contact with the reaction member 29. It is therefore very important to precisely determine the stroke of movement of the air valve seat 30 with respect to the central hub 25. The stroke is determined by the clearance between the key 37 and the groove 39 and the clearance between the key and the slit 38. In the illustrated arrangement, the diaphragm 24a is formed at the inner peripheral portion with a skirt portion 56 which covers the lower end of the slit 38 for preventing the key 37 from falling out in the assembling operation. By providing the skirt portion 56 in the diaphragm 24a, it becomes possible to locate the slit 38 at a rightwardly displaced position than in a conventional arrangement. It is therefore possible to locate the air valve seat 30 rightwards than in a conventional arrangement so that the axial length of the central hub 25 can be decreased without having any adverse effect on the function of the booster.

The skirt portion 56 of the diaphragm 24a has a thickness which provides a throttled passage 57 in the retracted position as shown in FIG. 1. The throttled passage 57 functions to moderate the air flow from the space 32b to the chamber 23 when the push rod 31 is rapidly actuated to thereby prevent noise which may otherwise be produced when air is abruptly drawn into a chamber under vacuum.

The invention has thus been shown and described with reference to a specific embodiment, however, it should be noted that the invention is in no way limited to the details of the illustrated structures but changes and modifications may be made without departing from the scope of the appended claims.

I claim:

1. A negative booster for an automobile brake system comprising housing means having an inside cavity, power piston means provided in said housing means for dividing the inside cavity of the housing means into a first chamber and a second chamber, an output rod associated with said power piston means and extending outwardly through said housing means, a control valve means carried by said power piston means for controlling communication between the first and second chambers and communication between one of the chambers and atmosphere, means for connecting the other chamber with a source of negative pressure, said power piston means including hub means made of a plastic material formed with a stepped axial hole having a large diameter hole section and a small diameter hole section which are connected together through a stepped shoulder portion, said output rod having a head axially and slidably received in the large diameter section and an annular flange extending outwardly from the head and spaced from an end surface of the hub means by a gap (δ), said gap decreasing and being eliminated during operation of said booster when said flange moves into abutting engagement with the end surface of the hub means.

2. A negative pressure booster in accordance with claim 1 in which said power piston means includes a diaphragm having a peripheral portion secured to the housing means and carrying said hub means, said power piston means being movable between a retracted position in which the diaphragm is folded and an extended position in which the diaphragm is unfolded said housing means having a wall located closely adjacent to the diaphragm in the unfolded position with minimum clearance between the housing means and the diaphragm.

3. A negative pressure booster in accordance with claim 2 in which said power piston means further includes a holder secured to said diaphragm which is attached to one end of said hub means, a retainer plate attached to the other end of said hub means for retaining said output rod to said power piston means, said holder having claws engaged with the other end of said hub means through said retainer.

4. A negative pressure booster in accordance with claim 2 in which said control valve means includes a valve member which is axially movable in said hub means, key means for limiting axial movement of said valve member, said hub means having a radially extending slit for receiving said key means, said slit being opened to an outer surface of said hub means, said diaphragm being provided with skirt means which extends along said outer surface of said hub means to cover the slit.

5. A negative pressure booster in accordance with claim 4 in which said skirt means has a thickness which forms a throttled air passage to said one chamber in the retracted position of the power piston means.

6. A negative pressure booster in accordance with claim 2 including a reaction member disposed between said stepped shoulder portion and the head of the output rod.

* * * * *